(12) United States Patent
Goldman

(10) Patent No.: US 10,042,813 B2
(45) Date of Patent: Aug. 7, 2018

(54) SIMD K-NEAREST-NEIGHBORS IMPLEMENTATION

(71) Applicant: Intel Corporation, Santa Clara, CA (US)

(72) Inventor: Amos Goldman, Jerusalem (IL)

(73) Assignee: Intel Corporation, Santa Clara, CA (US)

(*) Notice: Subject to any disclaimer, the term of this patent is extended or adjusted under 35 U.S.C. 154(b) by 773 days.

(21) Appl. No.: 14/570,413

(22) Filed: Dec. 15, 2014

(65) Prior Publication Data

US 2016/0170771 A1    Jun. 16, 2016

(51) Int. Cl.
G06F 15/00 (2006.01)
G06F 15/80 (2006.01)
G06F 7/02 (2006.01)
G06F 15/173 (2006.01)

(52) U.S. Cl.
CPC .......... *G06F 15/8007* (2013.01); *G06F 7/023* (2013.01); *G06F 7/026* (2013.01); *G06F 15/17375* (2013.01)

(58) Field of Classification Search
CPC .................................................. G06F 15/8007
See application file for complete search history.

(56) References Cited

U.S. PATENT DOCUMENTS 7,483,573 B2 *   1/2009   Lohweg ................. G06K 9/522
                                                           382/224
9,218,156 B2    12/2015   Bates 2002/0039446 A1 *   4/2002   Santoni ................ G06K 9/6217
                                                           382/209
2012/0179704 A1    7/2012   Xu et al.
2014/0334721 A1 *  11/2014   Cervin ............... G06K 9/00483
                                                           382/160

FOREIGN PATENT DOCUMENTS

CN    102576304 A    7/2012
CN    105700855 A    6/2016
(Continued)

OTHER PUBLICATIONS

Letters of Patent received for Taiwanese Patent Application No. 104135445, dated Jun. 11, 2017 as Patent No. I587137, 2 pages including 1 page of English translation.
(Continued)

*Primary Examiner* — Corey S Faherty
(74) *Attorney, Agent, or Firm* — Spectrum IP Law Group LLC

(57) ABSTRACT

Methods and apparatus relating to improved SIMD (Single Instruction, Multiple Data) K-nearest-neighbors implementations are described. An embodiment provides a technique for improving SIMD implementations of the multidimensional K-Nearest-Neighbors (KNN) techniques. One embodiment replaces the non-SIMD friendly part of the KNN algorithm with a sequence of SIMD operations. For example, in order to avoid branches in the algorithm hotspot (e.g., the inner loop), SIMD operations may be used to update the list of nearest distances (and neighbors) after each iteration. Other embodiments are also disclosed and claimed.

25 Claims, 7 Drawing Sheets

(56) References Cited

FOREIGN PATENT DOCUMENTS

DE    102015014800 A1    6/2016
WO    2014/143802 A1    9/2014

OTHER PUBLICATIONS

Notice on Having passed Preliminary Examination received for Chinese Patent Application No. 201510769833.9, dated Mar. 22, 2016, 2 pages including one page of English translation.
Notice of Publication of Chinese Patent Application No. 201510769833.9, dated Jun. 29, 2016, 2 pages including 1 page of English translation.
Office Action Received for Chinese Patent Application No. 201510769833.9, dated Sep. 29, 2017, 6 pages.

\* cited by examiner

```
Vector KD_v;        // the previous K nearest distances
Vector NewD_v;      // the new distance vector
BoolVector M_v;     // the shift mask vector
BoolVector MI_v;    // the index mask vector
Scalar D;

// initialization
KD_v = VNmask(K) ? VBroadcast(MAX) : VBrodcast(0);

// iterate over the DB sample vectors
for each Sample in Database
{
    // step 1 - calculate the distance.
    // this step is same as in the existing algorithm
    D = VectorDistance(SampleVector, TestVector);

// step 2 - broadcast
    NewD_v = D;

// step 3 - compare NewD_v to D_v with SIMD
    M_v = NewD_v < KD_v;

// step 4 - Rotate left all the elements larger
    // than D using the M_v mask
    NewD_v = M_v ? : VRotateLeft(NewD_v, 1) : NewD_v;

// step 5(A) - prepare the index mask
    MI_v = VXOR(VRotateLeft(M_v, 1), M_v);

// step 5(B) - insert the new index to the
    // distances vector using the index mask
    NewD_v = MI_v ? : KD_v : NewD_v;
}
```

Example: D=7, K=5, |SIMD|=8

*FIG. 4*

SIMD K-NEAREST-NEIGHBORS IMPLEMENTATION

FIELD

The present disclosure generally relates to the field of electronics. More particularly, an embodiment relates to improved SIMD (Single Instruction, Multiple Data) K-nearest-neighbors implementations.

BACKGROUND

Generally, SIMD is a technique employed to achieve data level parallelism. In particular, multiple data may be processed in multiple corresponding lanes of an SIMD engine in accordance with a single instruction.

SIMD can be used to speed up processing of graphics data, including the K-Nearest-Neighbors (KNN) algorithm. The KNN algorithm is generally used for classification or regression analysis in pattern recognition.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

FIG. 4 illustrates a sample pseudo code and corresponding sample values for an improved KNN method, according to an embodiment.

DETAILED DESCRIPTION

In the following description, numerous specific details are set forth in order to provide a thorough understanding of various embodiments. However, various embodiments may be practiced without the specific details. In other instances, well-known methods, procedures, components, and circuits have not been described in detail so as not to obscure the particular embodiments. Further, various aspects of embodiments may be performed using various means, such as integrated semiconductor circuits ("hardware"), computer-readable instructions organized into one or more programs ("software"), or some combination of hardware and software. For the purposes of this disclosure reference to "logic" shall mean either hardware, software, or some combination thereof.

Some embodiments relate to improved SIMD (Single Instruction, Multiple Data) K-Nearest-Neighbors (KNN) algorithm implementations. An embodiment provides a technique for improving SIMD implementations of the multidimensional KNN techniques. KNN is generally used in computer vision and/or machine learning and can be accelerated using SIMD engines such as various VLIW (Very Long Instruction Word) Digital Signal Processors (DSPs) and GPUs (Graphics Processing Units), such as processors discussed with reference to FIGS. 1-7. One embodiment replaces the non-SIMD friendly part of the KNN algorithm with a sequence of SIMD operations. More particularly, in order to avoid branches in the algorithm hotspot (e.g., the inner loop), SIMD operations may be used to update the list of nearest distances (and neighbors) after each iteration.

Figure 1:
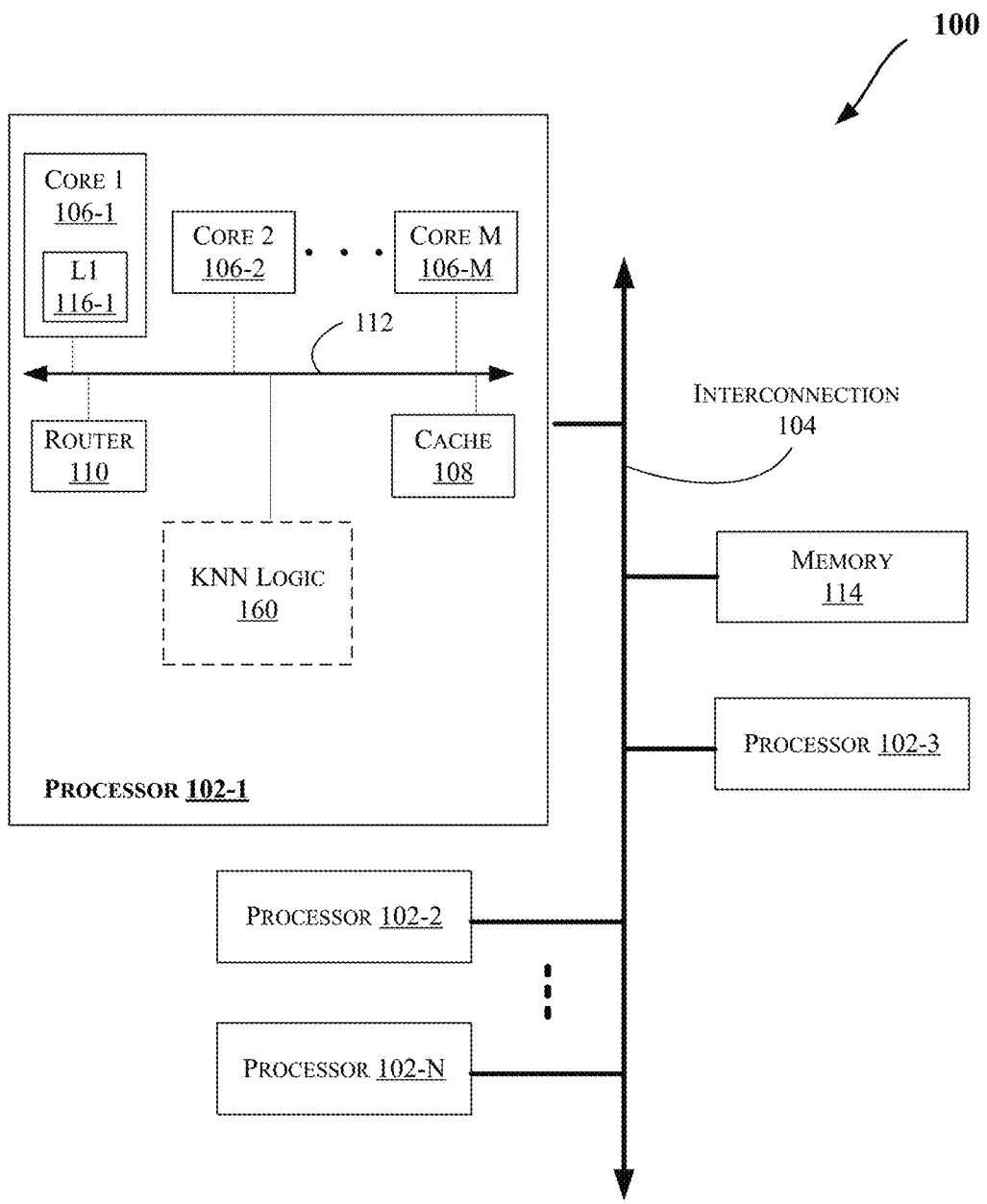
FIGS. 1 and 5-7 illustrate block diagrams of embodiments of computing systems, which may be utilized to implement various embodiments discussed herein.

Moreover, the techniques discussed herein may be utilized in various computing systems (e.g., a non-mobile device such as a desktop computer, a server, a work station, etc., as well as a mobile device such as a smartphone, tablet, UMPC (Ultra-Mobile Personal Computer), laptop computer, Ultrabook™ computing device, wearable devices (e.g., smart watches, smart glasses), etc.), including those discussed with reference to FIGS. 1-7. More particularly, FIG. 1 illustrates a block diagram of a computing system 100, according to an embodiment. The system 100 may include one or more processors 102-1 through 102-N (generally referred to herein as "processors 102" or "processor 102"). The processors 102 may communicate via an interconnection or bus 104. Each processor may include various components some of which are only discussed with reference to processor 102-1 for clarity. Accordingly, each of the remaining processors 102-2 through 102-N may include the same or similar components discussed with reference to the processor 102-1.

In an embodiment, the processor 102-1 includes one or more processor cores 106-1 through 106-M (referred to herein as "cores 106," or "core 106"), a cache 108, and/or a router 110. The processor cores 106 may be implemented on a single integrated circuit (IC) chip. Moreover, the chip may include one or more shared and/or private caches (such as cache 108), buses or interconnections (such as a bus or interconnection 112), graphics and/or memory controllers (such as those discussed with reference to FIGS. 5-7), or other components.

In one embodiment, the router 110 may be used to communicate between various components of the processor 102-1 and/or system 100. Moreover, the processor 102-1 may include more than one router 110. Furthermore, the multitude of routers 110 may be in communication to enable data routing between various components inside or outside of the processor 102-1.

The cache 108 may store data (e.g., including instructions) that are utilized by one or more components of the processor 102-1, such as the cores 106. For example, the cache 108 may locally cache data stored in a memory 114 for faster access by the components of the processor 102 (e.g., faster access by cores 106). As shown in FIG. 1, the memory 114 may communicate with the processors 102 via the interconnection 104. In an embodiment, the cache 108 (that may be shared) may be a mid-level cache (MLC), a last level cache (LLC), etc. Also, each of the cores 106 may include a level 1 (L1) cache (116-1) (generally referred to herein as "L1 cache 116") or other levels of cache such as a level 2 (L2) cache. Moreover, various components of the processor 102-1 may communicate with the cache 108 directly, through a bus (e.g., the bus 112), and/or a memory controller or hub.

As shown in FIG. 1, the processor 102 may further include KNN logic 160 to provide improved SIMD-based KNN implementations as discussed herein. In an embodiment, logic 160 (or other logic in system 100 or coupled to system 100) causes replacement of the non-SIMD friendly part of the KNN algorithm with a sequence of SIMD operations. More particularly, in order to avoid branches in the algorithm hotspot (e.g., the inner loop), SIMD operations (caused to be generated by logic 160) may be used to update the list of nearest distances (and neighbors) after each iteration.

Furthermore, logic 160 may have access to one or more storage devices discussed herein (such as cache 108, L1 cache 116, memory 114, or another memory in system 100) to store information relating to operations of logic 160 such as information communicated with various components of system 100 as discussed herein. Also, logic 160 may be located in a location other than that shown in FIG. 1.

Figure 2:
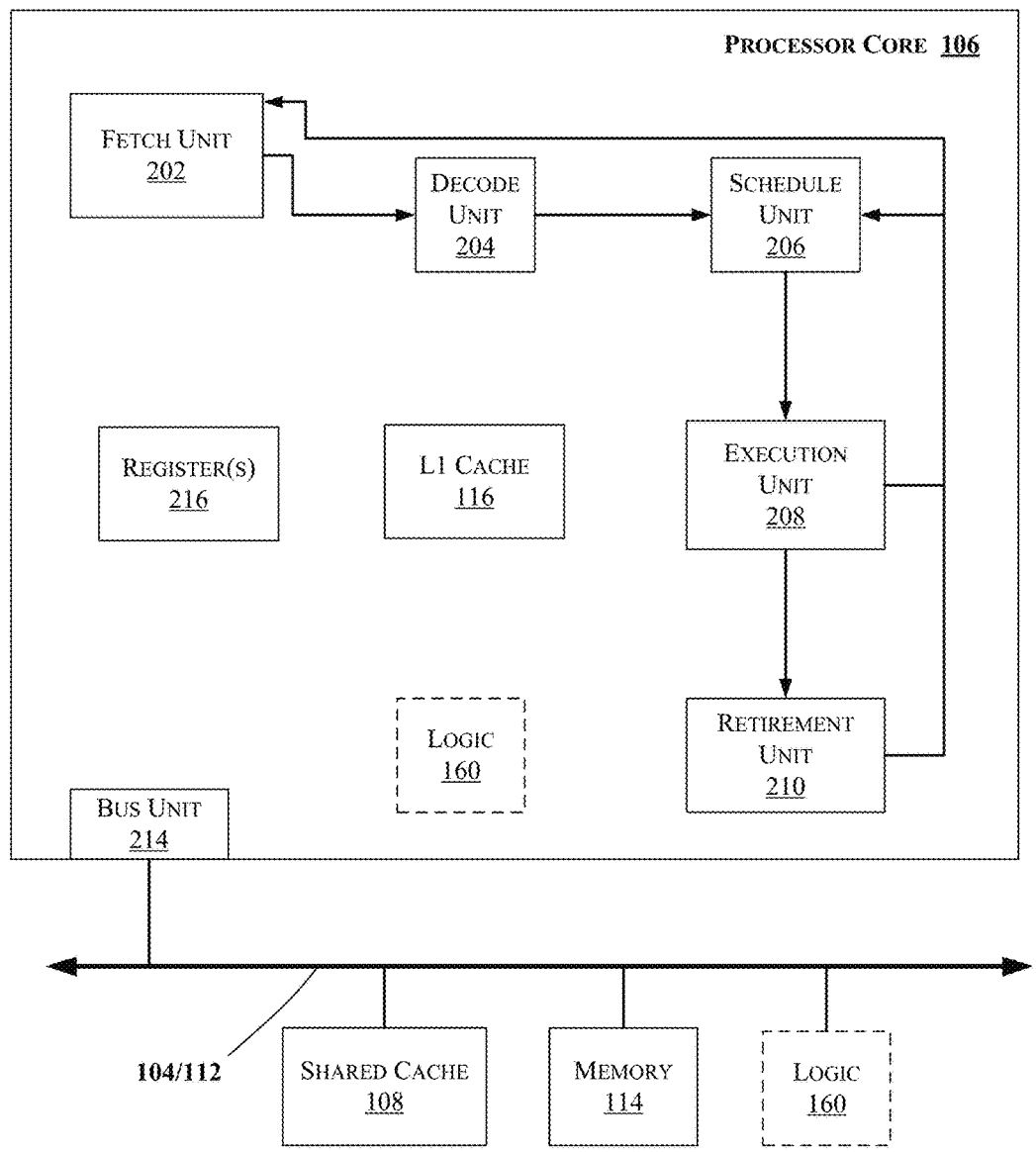
FIG. 2 illustrates a block diagram of portions of a processor core and other components of a computing system, according to an embodiment.

FIG. 2 illustrates a block diagram of portions of a processor core 106 and other components of a computing system, according to an embodiment. In one embodiment, the arrows shown in FIG. 2 illustrate the flow direction of instructions through the core 106. One or more processor cores (such as the processor core 106) may be implemented on a single integrated circuit chip (or die) such as discussed with reference to FIG. 1. Moreover, the chip may include one or more shared and/or private caches (e.g., cache 108 of FIG. 1), interconnections (e.g., interconnections 104 and/or 112 of FIG. 1), control units, memory controllers, or other components.

As illustrated in FIG. 2, the processor core 106 may include a fetch unit 202 to fetch instructions (including instructions with conditional branches) for execution by the core 106. The instructions may be fetched from any storage devices such as the memory 114 and/or the memory devices discussed with reference to FIGS. 5-7. The core 106 may also include a decode unit 204 to decode the fetched instruction. For instance, the decode unit 204 may decode the fetched instruction into a plurality of uops (micro-operations). Additionally, the core 106 may include a schedule unit 206. The schedule unit 206 may perform various operations associated with storing decoded instructions (e.g., received from the decode unit 204) until the instructions are ready for dispatch, e.g., until all source values of a decoded instruction become available. In one embodiment, the schedule unit 206 may schedule and/or issue (or dispatch) decoded instructions to an execution unit 208 for execution. The execution unit 208 may execute the dispatched instructions after they are decoded (e.g., by the decode unit 204) and dispatched (e.g., by the schedule unit 206). In an embodiment, the execution unit 208 may include more than one execution unit (such as an imaging computational unit, a graphics computational unit, a general-purpose computational unit, etc.). The execution unit 208 may also perform various arithmetic operations such as addition, subtraction, multiplication, and/or division, and may include one or more an arithmetic logic units (ALUs). In an embodiment, a co-processor (not shown) may perform various arithmetic operations in conjunction with the execution unit 208.

Further, the execution unit 208 may execute instructions out-of-order. Hence, the processor core 106 may be an out-of-order processor core in one embodiment. The core 106 may also include a retirement unit 210. The retirement unit 210 may retire executed instructions after they are committed. In an embodiment, retirement of the executed instructions may result in processor state being committed from the execution of the instructions, physical registers used by the instructions being de-allocated, etc.

The core 106 may also include a bus unit 214 to enable communication between components of the processor core 106 and other components (such as the components discussed with reference to FIG. 1) via one or more buses (e.g., buses 104 and/or 112). The core 106 may also include one or more registers 216 to store data accessed by various components of the core 106 (such as values used by logic 160 to implement the improved KNN technique discussed herein, e.g., with reference to FIGS. 3A-4).

Furthermore, even though FIG. 1 illustrates the logic 160 to be coupled to the core 106 via interconnect 112 (e.g., to offload KNN-related operations to another unit like a GPU, ASIC (Application Specific Integrated Circuit), etc.), in various embodiments logic 160 may be located elsewhere such as inside the core 106, coupled to the core via bus 104, etc.

In one embodiment, logic 160 determines the 'K' nearest database samples (e.g., organized in a list) with the shortest distance from a given test sample. Each of the algorithm's iterations first calculate the distance between the test sample and one of the database samples. The calculated distance is then compared with the 'K' shortest distances of the previous iterations. If the new distance is shorter than at least one of K shortest distances (e.g., where the list is ordered), then the "longest" distance from the previous iterations is replaced with the new distance. The motivation to accelerate KNN in SIMD engines is in part because generally the distance calculation is very SIMD friendly. However, comparing the list of distances with the new distance may be done in a scalar 'for' loop with at least two branches in it. This 'for' loop and the branches associated with it are not DSP friendly and they make this part of the algorithm the bottleneck of the implementation.

Moreover, some solutions may try to deal with this problem by storing all the distances and then sorting them at a later time to filter the K shortest distances. While this approach might improve the hotspot problem somewhat, it is only applicable for very small databases/lists, because of the need to store all the distances in memory. In addition, it increases the number of load and store operations, e.g., increasing delay, reducing performance, and/or increase power consumption. Another disadvantage of this approach is that it does not take advantage of the SIMD capabilities when sorting the elements. This yields very low regency of the issue slots and eventually inefficiency.

Accordingly, some embodiments provide a more efficient and/or quicker technique for replacing the distance update part (and the branches associated with it) with SIMD operations. This makes it possible to update the list of the nearest neighbors with no branches in the hotspot loop and thus with much better residency, efficiency, speed, etc. Further, using such embodiments with some VLIW DSP may result in a relative threefold improvement in performance (e.g., from about 18 cycles per sample down to about six cycles per sample, depending on the VLIW architecture, the number and type of issue slots, the SIMD width and payload, etc.—hence, different combinations can yield better or poorer acceleration).

In an embodiment, logic 160 keeps the list of the K shortest distances in a SIMD register (or other storage device such as those discussed herein, e.g., with reference to FIGS. 1-2 and 5-7) and uses SIMD operations to update the list with new distances. This is in contrast to using scaler comparison operations and inner 'for' loop to take care of the update. Also, using SIMD operations instead of branches optimizes the hotspot loop in at least one of the following ways: (a) In VLIW DSPs: avoiding the update 'for' loop makes it possible to 'unroll' and 'pipeline' the hotspot inner loop. This improves the issue slots residency dramatically; and (b) In GPU's: the use of SIMD operations prevent the penalty associated with branches and the wrong branch predictions.

As previously mentioned, some implementations of SIMD KNN acceleration may use scalar code for updating the list of distances. However, the scalar code is generally used inside the hotspot while in other implementations all the distances are stored and then later sorted to find the shortest 'K' differences. This second approach is better than the first one but it still has the following disadvantages compared to the embodiments discussed herein: (1) While possible in some engines, many DSP's and GPU's have limitations regarding the alignment and size of memory that can be stored and read. (2) The need to store all the distances make this approach reasonably applicable only to very small databases. This is a major limitation since the databases can have between tens of thousands to millions of samples vectors. (3) Although the update code runs out of the algorithm hotspot, it is still a scalar code with very low residency and poor efficiency due to the branches. The SIMD code achieves much better performance. (4) Storing the temporal distances and reading them again is involved with at least two more IO (Input/Output) operations per sample. These operations tend to be expensive both in terms of power and in terms of latency.

Generally, the value of K is low (e.g., between 1 to 15) and in most cases it is lower than the SIMD level of the engine. To this end, an embodiment maintains a sorted list of the 'K' nearest distances (and neighbors) and updates it with new values using SIMD operation.

Figure 3A:
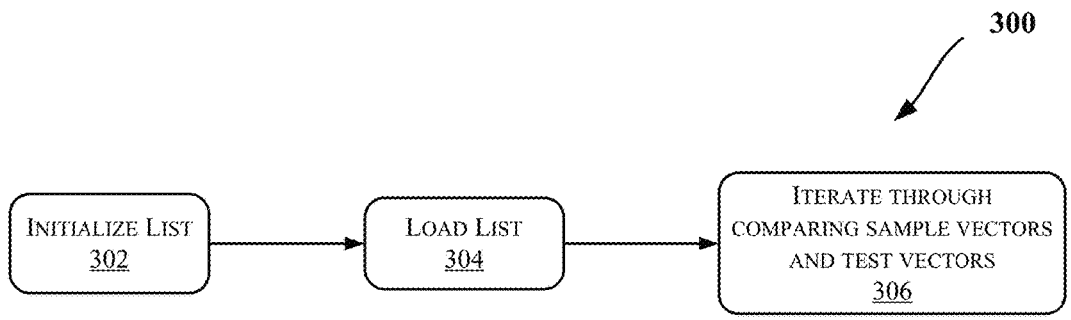
FIGS. 3A and 3B illustrate flow diagrams of operations associated with performing an improved KNN method, in accordance with some embodiments.

FIG. 3A illustrates a flow diagram of a method 300 to provide an improved KNN, according to an embodiment. In one embodiment, various components discussed with reference to FIGS. 1-2 and 5-7 (including for example logic 160) may be utilized to perform one or more of the operations discussed with reference to FIG. 3A.

Referring to FIGS. 3A, at operation 302 (initialization stage), all the elements of the list of distances are initialized to 'MAX DISTANCE'. The list is then loaded (operation 304) into a vector register (KD_v) or another storage device such as those discussed here. In an embodiment, this vector is kept sorted from largest to smallest throughout performance of KNN algorithm flow (e.g., while method 300 is executing), e.g., to increase look up speed.

At operation 306 (loop stage/the hotspot), method 300 loops over the database/stored sample vectors and compares them to the test vectors. In each iteration, the distance is calculated and then compared to the list of the 'K' nearest distances from the previous iteration.

Figure 3B:
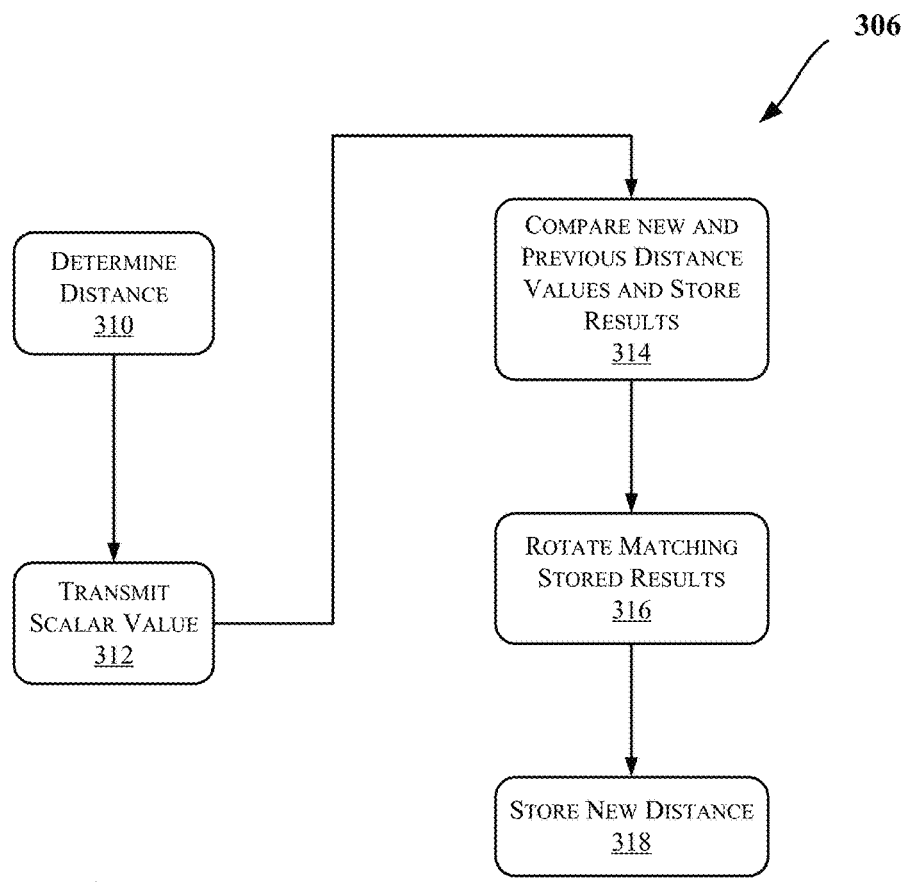

FIG. 3B illustrates a flow diagram of a method 306 to provide the loop stage of the KNN method of FIG. 3A, according to an embodiment. In one embodiment, various components discussed with reference to FIGS. 1-2 and 5-7 (including for example logic 160) may be utilized to perform one or more of the operations discussed with reference to FIG. 3B.

Referring to FIG. 3B, at an operation 310 (loop stage 1), the distance (D) between the test vector and the current database vector is calculated/determined. This stage is performed using SIMD operations. At an operation 312 (loop stage 2), the scalar value D is transmitted/broadcasted to a new vector register (NewD_v). This operation assigns the value of D to all the elements of NewD_v.

At an operation 314 (loop stage 3), KD_v and NewD_v values are compared using a SIMD operation and the results are stored in a Boolean vector register (M_v). At operation 314, for each index 'i' the comparison sets M_v[i] to '1' if KD_v[i] is greater than the NewD_v[i] and '0' otherwise. Since KD_v is sorted from largest to smallest in an embodiment and all the elements of NewD_v have the same value, there would be at most one index where M_v[i] !=M_v[i+1]. This index (i) is the new index of the new value in the sorted list.

At an operation 316 (loop stage 4), all the elements in KD_v that were greater than the new distance are rotated left (select/shuffle elements left), using an SIMD operation. This can be achieved by merging KD_v with ShiftLeft(KD_v) using the M_v as the merging mask or KD_v[i]=M_v[i] ? KD_v[i+1]:KD_v[i], where "?" refers to a special ternary operator for conditional expressions with a function that may be described by a template such as "condition ? evaluated-when-true:evaluated-when-false", and e.g., where in the aforementioned expression, "?" indicates that KD_v[i] is shifted left for all the elements indices 'i' for which M_v[i] is true (or 1).

At an operation 318 (loop stage 5), the new distance D is stored in the i'th element of KD_v. To do this, the a new mask (MI_v) is created by XOR'ing M_v with ShiftLeft (M_v). Since there could be at most one index (i) where M_v[i] !=M_v[i+1], MI_v would have at most one entry set to '1'. The new distance 'D' is then inserted into KD_v[i] by merging KD_v with NewD_v using MI_v as the merging mask, as follows: NewD_v[i]=MI_v[i] ? NewD_v[i]:KD_v[i].

Some variation of the method return not just the K shortest distances but also the K indexes of the nearest neighbors. To support, this the list of nearest indexes can be maintained using the M_v and MI_v masks in the same way the distances are maintained.

FIG. 4 illustrates a sample pseudo code and corresponding sample values for an improved KNN method, according to an embodiment. More particularly, the pseudo code (on the left side of FIG. 4) demonstrates sample operations and data for the KNN algorithm flow and shows the core register values after each stage (on the right side of FIG. 4), e.g., as discussed with reference to FIGS. 3A and 3B, in accordance with some embodiments. In the example of FIG. 4, K (K nearest neighbor) is 5, D (Distance) is 7, and the SIMD length is 8.

As discussed herein, KNN is used in computer vision and machine learning solutions. Because the distance calculation is very SIMD friendly, some embodiments are accelerated in GPUs or in a dedicated VLIW DSPs. Also, using optimizations provided by some embodiments would improve the power consumption and/or performance of any KNN implementation running on the GPU or a dedicated DSP.

Figure 5:
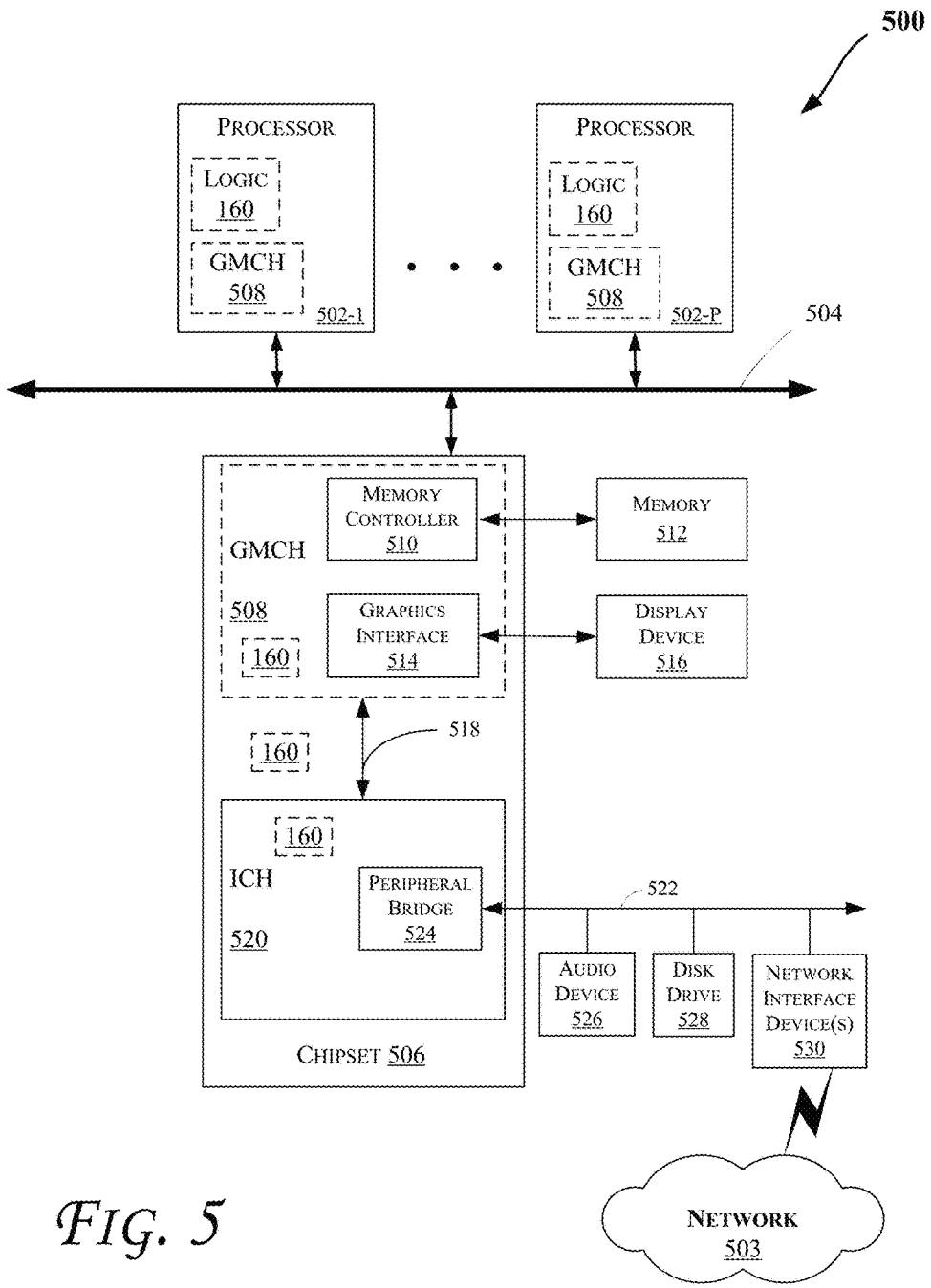

FIG. 5 illustrates a block diagram of a computing system 500 in accordance with an embodiment. The computing system 500 may include one or more central processing unit(s) (CPUs) or processors 502-1 through 502-P (which may be referred to herein as "processors 502" or "processor 502"). The processors 502 may communicate via an interconnection network (or bus) 504. The processors 502 may include a general purpose processor, a network processor (that processes data communicated over a computer network 503), or other types of a processor (including a reduced instruction set computer (RISC) processor or a complex instruction set computer (CISC)).

Moreover, the processors 502 may have a single or multiple core design. The processors 502 with a multiple core design may integrate different types of processor cores on the same integrated circuit (IC) die. Also, the processors 502 with a multiple core design may be implemented as symmetrical or asymmetrical multiprocessors. In an embodiment, one or more of the processors 502 may be the same or similar to the processors 102 of FIG. 1. In some embodiments, one or more of the processors 502 may include one or more of the cores 106 and logic 160 of FIG. 1. Also, the operations discussed with reference to FIGS. 1-4 may be performed by one or more components of the system 500.

A chipset 506 may also communicate with the interconnection network 504. The chipset 506 may include a graphics and memory control hub (GMCH) 508. The GMCH 508 may include a memory controller 510 that communicates with a memory 512. The memory 512 may store data, including sequences of instructions that are executed by the processor 502, or any other device included in the computing system 500. In one embodiment, the memory 512 may include one or more volatile storage (or memory) devices such as random access memory (RAM), dynamic RAM (DRAM), synchronous DRAM (SDRAM), static RAM (SRAM), or other types of storage devices. Nonvolatile memory may also be utilized such as a hard disk. Additional devices may communicate via the interconnection network 504, such as multiple CPUs and/or multiple system memories.

The GMCH 508 may also include a graphics interface 514 that communicates with a display device 516. In one embodiment, the graphics interface 514 may communicate with the display device 516 via an accelerated graphics port (AGP) or Peripheral Component Interconnect (PCI) (or PCI express (PCIe) interface). In an embodiment, the display device 516 (such as a flat panel display, a cathode ray tube (CRT), a projection screen, etc.) may communicate with the graphics interface 514 through, for example, a signal converter that translates a digital representation of an image stored in a storage device such as video memory or system memory into display signals that are interpreted and displayed by the display device 518. The display signals produced may pass through various control devices before being interpreted by and subsequently displayed on the display device 516.

A hub interface 518 may allow the GMCH 508 and an input/output control hub (ICH) 520 to communicate. The ICH 520 may provide an interface to I/O devices that communicate with the computing system 500. The ICH 520 may communicate with a bus 522 through a peripheral bridge (or controller) 524, such as a peripheral component interconnect (PCI) bridge, a universal serial bus (USB) controller, or other types of peripheral bridges or controllers. The bridge 524 may provide a data path between the processor 502 and peripheral devices. Other types of topologies may be utilized. Also, multiple buses may communicate with the ICH 520, e.g., through multiple bridges or controllers. Moreover, other peripherals in communication with the ICH 520 may include, in various embodiments, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), or other devices.

The bus 522 may communicate with an audio device 526, one or more disk drive(s) 528, and one or more network interface device(s) 530 (which is in communication with the computer network 503). Other devices may communicate via the bus 522. Also, various components (such as the network interface device 530) may communicate with the GMCH 508 in some embodiments. In addition, the processor 502 and the GMCH 508 may be combined to form a single chip. Furthermore, a graphics accelerator (e.g., AGP and/or PCI/PCIe graphics device) may be included within the GMCH 508 in other embodiments.

Furthermore, the computing system 500 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 528), a floppy disk, a compact disk ROM (CD-ROM), a digital versatile disk (DVD), flash memory, a magneto-optical disk, or other types of nonvolatile machine-readable media that are capable of storing electronic data (e.g., including instructions). In an embodiment, components of the system 500 may be arranged in a point-to-point (PtP) configuration. For example, processors, memory, and/or input/output devices may be interconnected by a number of point-to-point interfaces.

Figure 6:
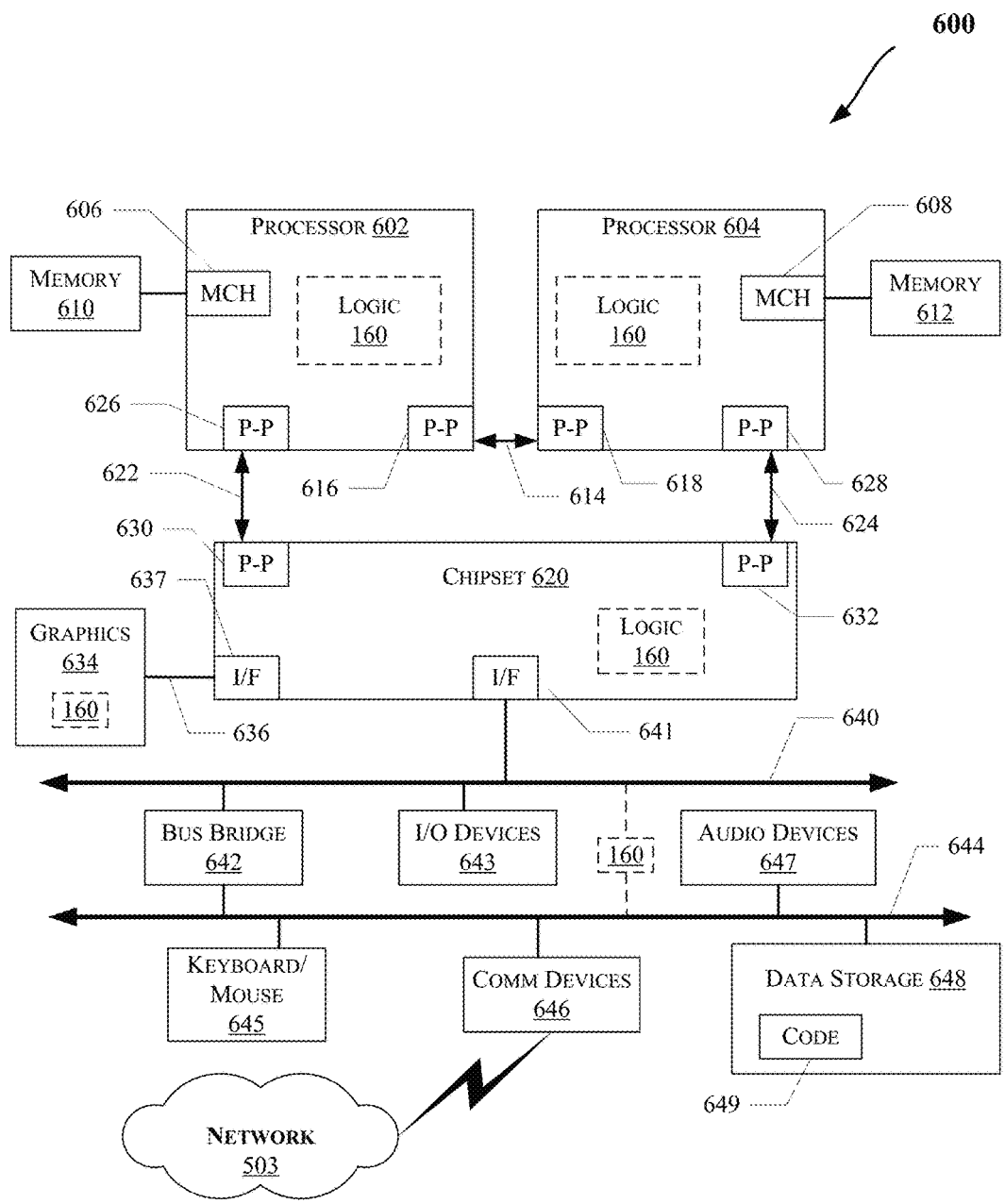

FIG. 6 illustrates a computing system 600 that is arranged in a point-to-point (PtP) configuration, according to an embodiment. In particular, FIG. 6 shows a system where processors, memory, and input/output devices are interconnected by a number of point-to-point interfaces. The operations discussed with reference to FIGS. 1-5 may be performed by one or more components of the system 600.

As illustrated in FIG. 6, the system 600 may include several processors, of which only two, processors 602 and 604 are shown for clarity. The processors 602 and 604 may each include a local memory controller hub (MCH) 606 and 608 to enable communication with memories 610 and 612. The memories 610 and/or 612 may store various data such as those discussed with reference to the memory 512 of FIG. 5. Also, the processors 602 and 604 may include one or more of the cores 106 and logic 160 of FIG. 1.

In an embodiment, the processors 602 and 604 may be one of the processors 502 discussed with reference to FIG. 5. The processors 602 and 604 may exchange data via a point-to-point (PtP) interface 614 using PtP interface circuits 616 and 618, respectively. Also, the processors 602 and 604 may each exchange data with a chipset 620 via individual PtP interfaces 622 and 624 using point-to-point interface circuits 626, 628, 630, and 632. The chipset 620 may further exchange data with a high-performance graphics circuit 634 via a high-performance graphics interface 636, e.g., using a PtP interface circuit 637.

In at least one embodiment, one or more operations discussed with reference to FIGS. 1-5 may be performed by the processors 602 or 604 and/or other components of the system 600 such as those communicating via a bus 640. Other embodiments, however, may exist in other circuits, logic units, or devices within the system 600 of FIG. 6. Furthermore, some embodiments may be distributed throughout several circuits, logic units, or devices illustrated in FIG. 6.

Chipset 620 may communicate with the bus 640 using a PtP interface circuit 641. The bus 640 may have one or more devices that communicate with it, such as a bus bridge 642 and I/O devices 643. Via a bus 644, the bus bridge 642 may communicate with other devices such as a keyboard/mouse 645, communication devices 646 (such as modems, network interface devices, or other communication devices that may communicate with the computer network 503), audio I/O device, and/or a data storage device 648. The data storage device 648 may store code 649 that may be executed by the processors 602 and/or 604.

Figure 7:
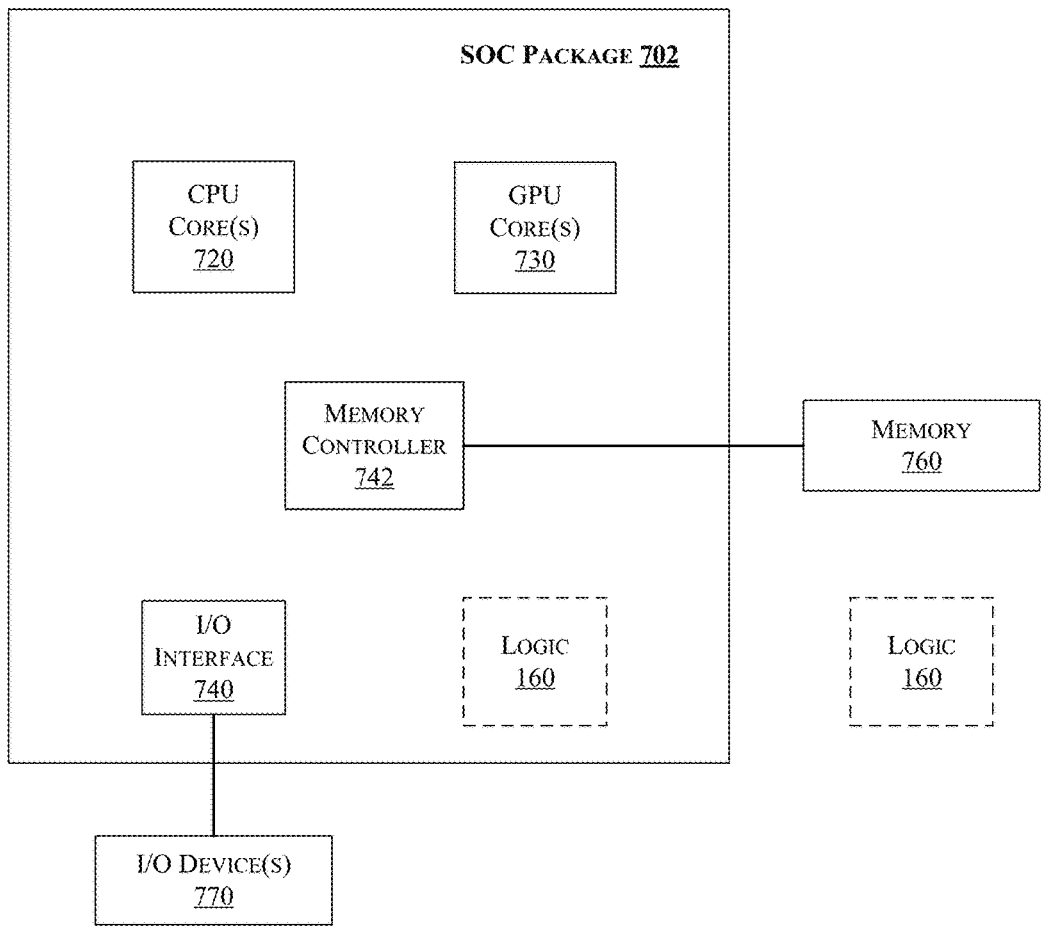

In some embodiments, one or more of the components discussed herein can be embodied as a System On Chip (SOC) device. FIG. 7 illustrates a block diagram of an SOC package in accordance with an embodiment. As illustrated in FIG. 7, SOC 702 includes one or more Central Processing Unit (CPU) cores 720, one or more Graphics Processor Unit (GPU) cores 730, an Input/Output (I/O) interface 740, and a memory controller 742. Various components of the SOC package 702 may be coupled to an interconnect or bus such as discussed herein with reference to the other figures. Also, the SOC package 702 may include more or less components, such as those discussed herein with reference to the other figures. Further, each component of the SOC package 720 may include one or more other components, e.g., as discussed with reference to the other figures herein. In one embodiment, SOC package 702 (and its components) is provided on one or more Integrated Circuit (IC) die, e.g., which are packaged into a single semiconductor device.

As illustrated in FIG. 7, SOC package 702 is coupled to a memory 760 (which may be similar to or the same as memory discussed herein with reference to the other figures) via the memory controller 742. In an embodiment, the memory 760 (or a portion of it) can be integrated on the SOC package 702.

The I/O interface 740 may be coupled to one or more I/O devices 770, e.g., via an interconnect and/or bus such as discussed herein with reference to other figures. I/O device(s) 770 may include one or more of a keyboard, a mouse, a touchpad, a display, an image/video capture device (such as a camera or camcorder/video recorder), a touch screen, a speaker, or the like. Furthermore, SOC package 702 may include/integrate the logic 160 in an embodiment. Alternatively, the logic 160 may be provided outside of the SOC package 702 (i.e., as a discrete logic).

The following examples pertain to further embodiments. Example 1 includes an apparatus comprising: logic to cause replacement of one or more non-SIMD (Single Instruction, Multiple Data) portions of a K-Nearest-Neighbors (KNN) technique with one or more SIMD operations at least in part based on comparison of a first distance, corresponding to a current iteration of the KNN technique, and a second distance, corresponding to a shortest distance of a previous iteration of the KNN technique. Example 2 includes the apparatus of example 1, wherein the logic is to cause replacement of the one or more non-SIMD portions of the KNN technique to avoid branches in an inner loop of the KNN technique. Example 3 includes the apparatus of example 1, wherein the one or more non-SIMD portions of the KNN technique are to comprise one or more scalar operations. Example 4 includes the apparatus of example 1, wherein the one or more SIMD operations are to update a list of nearest distances after each iteration of the KNN technique. Example 5 includes the apparatus of example 4, further comprising memory to store the list. Example 6 includes the apparatus of example 1, wherein one of a VLIW (Very Long Instruction Word) Digital Signal Processor (DSP) or a GPU (Graphics Processing Unit) is to comprise the logic. Example 7 includes the apparatus of example 1, wherein a processor, having one or more processor cores, is to comprise the logic. Example 8 includes the apparatus of example 1, wherein the logic, a processor having one or more processor cores, and memory are on a same integrated device.

Example 9 includes a method comprising: causing replacement of one or more non-SIMD (Single Instruction, Multiple Data) portions of a K-Nearest-Neighbors (KNN) technique with one or more SIMD operations at least in part based on comparison of a first distance, corresponding to a current iteration of the KNN technique, and a second distance, corresponding to a shortest distance of a previous iteration of the KNN technique. Example 10 includes the method of example 9, further comprising causing replacement of the one or more non-SIMD portions of the KNN technique to avoid branches in an inner loop of the KNN technique. Example 11 includes the method of example 9, wherein the one or more non-SIMD portions of the KNN technique comprise one or more scalar operations. Example 12 includes the method of example 9, further comprising the one or more SIMD operations updating a list of nearest distances after each iteration of the KNN technique. Example 13 includes the method of example 12, further comprising storing the list in memory. Example 14 includes the method of example 9, wherein the replacement operation is performed by one of a VLIW (Very Long Instruction Word) Digital Signal Processor (DSP) or a GPU (Graphics Processing Unit).

Example 15 includes a computer-readable medium comprising one or more instructions that when executed on a processor configure the processor to perform one or more operations to: cause replacement of one or more non-SIMD (Single Instruction, Multiple Data) portions of a K-Nearest-Neighbors (KNN) technique with one or more SIMD operations at least in part based on comparison of a first distance, corresponding to a current iteration of the KNN technique, and a second distance, corresponding to a shortest distance of a previous iteration of the KNN technique. Example 16 includes the computer-readable medium of example 15, further comprising one or more instructions that when executed on the processor configure the processor to perform one or more operations to cause replacement of the one or more non-SIMD portions of the KNN technique to avoid branches in an inner loop of the KNN technique. Example 17 includes the computer-readable medium of example 15, wherein the one or more non-SIMD portions of the KNN technique comprise one or more scalar operations. Example 18 includes the computer-readable medium of example 15, further comprising one or more instructions that when executed on the processor configure the processor to perform one or more operations to cause the one or more SIMD operations to update a list of nearest distances after each iteration of the KNN technique. Example 19 includes the computer-readable medium of example 15, further comprising one or more instructions that when executed on the processor configure the processor to perform one or more operations to cause storing the list in memory. Example 20 includes the computer-readable medium of example 15, wherein the replacement operation is performed by one of a VLIW (Very Long Instruction Word) Digital Signal Processor (DSP) or a GPU (Graphics Processing Unit).

Example 21 includes a system comprising: a processor having one or more processor cores; a display device, coupled to the processor, to display one or more images; and logic to cause replacement of one or more non-SIMD (Single Instruction, Multiple Data) portions of a K-Nearest-Neighbors (KNN) technique with one or more SIMD operations at least in part based on comparison of a first distance, corresponding to a current iteration of the KNN technique, and a second distance, corresponding to a shortest distance of a previous iteration of the KNN technique. Example 22 includes the system of example 21, wherein the logic is to cause replacement of the one or more non-SIMD portions of the KNN technique to avoid branches in an inner loop of the KNN technique. Example 23 includes the system of example 21, wherein the one or more non-SIMD portions of the KNN technique are to comprise one or more scalar operations. Example 24 includes the system of example 21, wherein the one or more SIMD operations are to update a list of nearest distances after each iteration of the KNN technique. Example 25 includes the system of example 24, further comprising memory to store the list. Example 26 includes the system of example 21, wherein one of a VLIW (Very Long Instruction Word) Digital Signal Processor (DSP) or a GPU (Graphics Processing Unit) is to comprise the logic. Example 27 includes the system of example 21, wherein the processor is to comprise the logic. Example 28 includes the system of example 21, wherein the logic, the processor, and memory are on a same integrated device.

Example 29 includes an apparatus comprising means to perform a method as set forth in any preceding example.

Example 30 comprises machine-readable storage including machine-readable instructions, when executed, to implement a method or realize an apparatus as set forth in any preceding example.

In various embodiments, the operations discussed herein, e.g., with reference to FIGS. 1-7, may be implemented as hardware (e.g., logic circuitry), software, firmware, or combinations thereof, which may be provided as a computer program product, e.g., including a tangible machine-readable or computer-readable medium having stored thereon instructions (or software procedures) used to program a computer to perform a process discussed herein. The machine-readable medium may include a storage device such as those discussed with respect to FIGS. 1-7.

Additionally, such computer-readable media may be downloaded as a computer program product, wherein the program may be transferred from a remote computer (e.g., a server) to a requesting computer (e.g., a client) by way of data signals provided in a carrier wave or other propagation medium via a communication link (e.g., a bus, a modem, or a network connection).

Reference in the specification to "one embodiment" or "an embodiment" means that a particular feature, structure, and/or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. An apparatus comprising:
   logic to cause replacement of one or more non-SIMD (Single Instruction, Multiple Data) portions of a K-Nearest-Neighbors (KNN) technique with one or more SIMD operations at least in part based on comparison of a first distance, corresponding to a current iteration of the KNN technique, and a second distance, corresponding to a shortest distance of a previous iteration of the KNN technique.

2. The apparatus of claim 1, wherein the logic is to cause replacement of the one or more non-SIMD portions of the KNN technique to avoid branches in an inner loop of the KNN technique.

3. The apparatus of claim 1, wherein the one or more non-SIMD portions of the KNN technique are to comprise one or more scalar operations.

4. The apparatus of claim 1, wherein the one or more SIMD operations are to update a list of nearest distances after each iteration of the KNN technique.

5. The apparatus of claim 4, further comprising memory to store the list.

6. The apparatus of claim 1, wherein one of a VLIW (Very Long Instruction Word) Digital Signal Processor (DSP) or a GPU (Graphics Processing Unit) is to comprise the logic.

7. The apparatus of claim 1, wherein a processor, having one or more processor cores, is to comprise the logic.

8. The apparatus of claim 1, wherein the logic, a processor having one or more processor cores, and memory are on a same integrated device.

9. A method comprising:
   causing replacement of one or more non-SIMD (Single Instruction, Multiple Data) portions of a K-Nearest-Neighbors (KNN) technique with one or more SIMD operations at least in part based on comparison of a first distance, corresponding to a current iteration of the KNN technique, and a second distance, corresponding to a shortest distance of a previous iteration of the KNN technique.

10. The method of claim 9, further comprising causing replacement of the one or more non-SIMD portions of the KNN technique to avoid branches in an inner loop of the KNN technique.

11. The method of claim 9, wherein the one or more non-SIMD portions of the KNN technique comprise one or more scalar operations.

12. The method of claim 9, further comprising the one or more SIMD operations updating a list of nearest distances after each iteration of the KNN technique.

13. The method of claim 12, further comprising storing the list in memory.

14. The method of claim 9, wherein the replacement operation is performed by one of a VLIW (Very Long Instruction Word) Digital Signal Processor (DSP) or a GPU (Graphics Processing Unit).

15. A non-transitory computer-readable medium comprising one or more instructions that when executed on a processor configure the processor to perform one or more operations to:
   cause replacement of one or more non-SIMD (Single Instruction, Multiple Data) portions of a K-Nearest-Neighbors (KNN) technique with one or more SIMD operations at least in part based on comparison of a first distance, corresponding to a current iteration of the KNN technique, and a second distance, corresponding to a shortest distance of a previous iteration of the KNN technique.

16. The non-transitory computer-readable medium of claim 15, further comprising one or more instructions that when executed on the processor configure the processor to perform one or more operations to cause replacement of the one or more non-SIMD portions of the KNN technique to avoid branches in an inner loop of the KNN technique.

17. The non-transitory computer-readable medium of claim 15, wherein the one or more non-SIMD portions of the KNN technique comprise one or more scalar operations.

18. The non-transitory computer-readable medium of claim 15, further comprising one or more instructions that when executed on the processor configure the processor to perform one or more operations to cause the one or more SIMD operations to update a list of nearest distances after each iteration of the KNN technique.

19. The non-transitory computer-readable medium of claim 15, further comprising one or more instructions that when executed on the processor configure the processor to perform one or more operations to cause storing the list in memory.

20. The non-transitory computer-readable medium of claim 15, wherein the replacement operation is performed by one of a VLIW (Very Long Instruction Word) Digital Signal Processor (DSP) or a GPU (Graphics Processing Unit).

21. A system comprising:
  a processor having one or more processor cores;
  a display device, coupled to the processor, to display one or more images; and
  logic to cause replacement of one or more non-SIMD (Single Instruction, Multiple Data) portions of a K-Nearest-Neighbors (KNN) technique with one or more SIMD operations at least in part based on comparison of a first distance, corresponding to a current iteration of the KNN technique, and a second distance, corresponding to a shortest distance of a previous iteration of the KNN technique.

22. The system of claim 21, wherein the logic is to cause replacement of the one or more non-SIMD portions of the KNN technique to avoid branches in an inner loop of the KNN technique.

23. The system of claim 21, wherein the one or more non-SIMD portions of the KNN technique are to comprise one or more scalar operations.

24. The system of claim 21, wherein the one or more SIMD operations are to update a list of nearest distances after each iteration of the KNN technique.

25. The system of claim 24, further comprising memory to store the list.

* * * * *